(12) United States Patent
Lee et al.

(10) Patent No.: US 7,785,012 B2
(45) Date of Patent: Aug. 31, 2010

(54) BEARING ARRANGEMENT

(75) Inventors: Lawrence Lee, Harwicke (GB); Andrei Plop, Lechlade (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 456 days.

(21) Appl. No.: 11/334,188

(22) Filed: Jan. 17, 2006

(65) Prior Publication Data
US 2006/0171619 A1 Aug. 3, 2006

(30) Foreign Application Priority Data
Feb. 2, 2005 (GB) ................... 0502088.8

(51) Int. Cl.
*E21B 10/24* (2006.01)
(52) U.S. Cl. ........................ 384/97; 384/322
(58) Field of Classification Search ............ 384/91–93, 384/97, 144, 285, 293, 322, 377, 378, 398, 384/399, 468
See application file for complete search history.

(56) References Cited

U.S. PATENT DOCUMENTS

| 2,085,814 A | * | 7/1937 | Matthews et al. ........... 384/378 |
| 4,241,959 A | | 12/1980 | Frister |
| 4,472,004 A | | 9/1984 | Fingerle et al. |
| 4,577,704 A | * | 3/1986 | Aumann ..................... 175/107 |
| 4,641,978 A | | 2/1987 | Kapich |
| 6,109,790 A | * | 8/2000 | von Gynz-Rekowski et al. . 384/97 |
| 6,267,204 B1 | * | 7/2001 | Kristensen et al. .......... 384/398 |

FOREIGN PATENT DOCUMENTS

| CA | 1253441 | | 5/1989 |
| JP | 55064172 A | * | 5/1980 |
| JP | 2004218789 | | 5/2004 |

\* cited by examiner

*Primary Examiner*—Thomas R Hannon
(74) *Attorney, Agent, or Firm*—Vin Loccisano; Jeremy P. Welch; Brigitte L. Echols

(57) ABSTRACT

A bearing arrangement comprises a first component 10 and a second component 12, bearings 14, 16 being provided to support one of the first and second components 10, 12 for rotation relative to the other of the first and second components 10, 12, a radial clearance 24 being provided between cylindrical surfaces of the first and second components 10, 12, fluid being supplied through the radial clearance 24 to lubricate the bearings 14, 16, wherein the cylindrical surface of at least one of the first and second components 10, 12 is shaped to define at least one pocket 30.

4 Claims, 1 Drawing Sheet

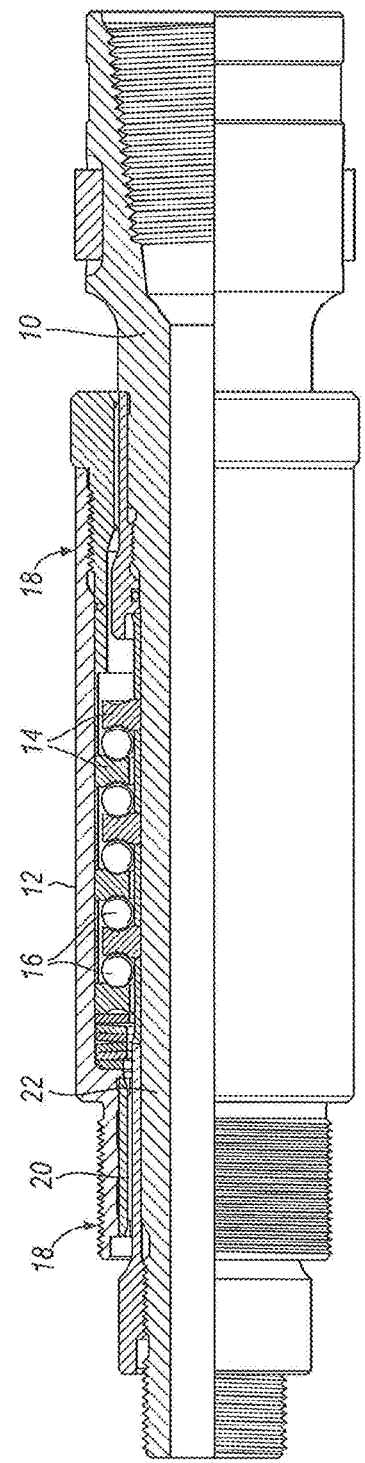
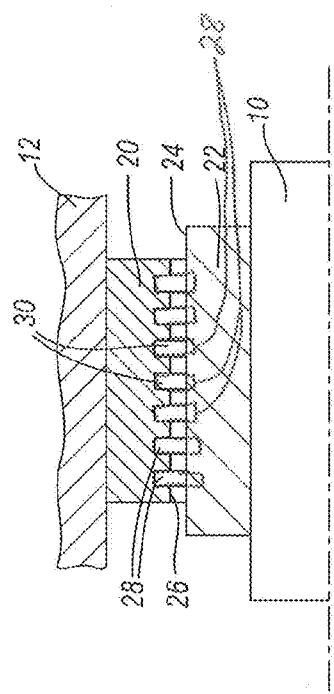

BEARING ARRANGEMENT

This invention relates to a bearing arrangement, for example for use in a component intended for use downhole in the formation of a wellbore.

The use of drilling fluid or mud powered downhole motors to provide the rotary drive to a drill bit is becoming increasingly common. One type of motor suitable for use in such an application is a progressive cavity motor having a rotor rotatable within a stator or stationary housing, a bearing arrangement supporting the rotor for rotation. The rotor and/or the stator is provided with formations such that the rotor and stator together define a series of cavities, the application of fluid under pressure to which causes the rotor to rotate relative to the stator. Alternatively, the rotor may support a turbine, the application of fluid under pressure to which causes the turbine and the rotor to rotate. The bearing arrangement typically includes ball bearings located within suitable ball races. In order to provide lubrication for the bearing arrangement, a proportion of the drilling fluid supplied to the motor is allowed to pass between components forming parts of or carried by the rotor and the stator, the clearance between the parts limiting the flow of fluid to the bearing arrangement. Typically, the proportion of fluid supplied to the bearing arrangement is in the region of 5% to 10% of the total fluid supply to the motor. If a greater quantity of fluid is supplied to the bearings, insufficient fluid may be available to correctly operate the motor or other downhole fluid driven equipment.

Where motors having an outer diameter of 9⅝" have been used, control of the dimensions of the above mentioned clearance has been sufficient to achieve an acceptable low flow rate of fluid to the bearing arrangement. However, it is becoming increasingly common to use smaller motors, for example motors having an outer diameter of 3⅛". With such motors, the minimum clearances between the relevant components are too large to be suitable for use in limiting the supply of the fluid to the bearing arrangement to an acceptable level, the minimum acceptable clearances resulting in approximately 50% of the fluid flowing to the bearing arrangement.

According to the present invention there is provided a bearing arrangement comprising a first component and a second component, bearings being provided to support one of the first and second components for rotation relative to the other of the first and second components, a radial clearance being provided between cylindrical surfaces of the first and second components, fluid being supplied through the radial clearance to lubricate the bearings, wherein the cylindrical surface of at least one of the first and second components is shaped to define at least one pocket.

The provision of at least one pocket serves to interrupt the flow of fluid between the cylindrical surfaces, thereby restricting the flow of fluid to the bearings. The at least one pocket conveniently comprises at least one groove formed in at least one of the cylindrical surfaces. The pockets may all be formed in one of the cylindrical surfaces, or could be formed in both surfaces.

The or each groove may be of annular form.

In an alternative arrangement, the at least one pocket may comprise at least one helical or spiral shaped groove. The orientation of the spiral may be chosen so as to "pump" fluid away from the bearings, as well as to interrupt or interfere with fluid flow towards the bearings. This may be achieved, for example, for a motor with a right-hand rotating rotor, by providing a left-hand orientated spiral groove.

The invention will further be described, by way of example, with reference to the accompanying drawings, in which:

FIG. 1 is a view, partly in section, illustrating part of a motor incorporating a bearing arrangement in accordance with one embodiment of the invention; and FIG. 2 is a diagrammatic sectional view illustrating part of the bearing arrangement of the motor of FIG. 1.

Referring firstly to FIG. 1, part of a motor is shown which comprises a shaft 10 supported for rotation by a cylindrical housing 12, the shaft 10 extending completely through the housing 12. The shaft 10 and housing 12 are both provided with components 14 defining ball races within which ball bearings 16 are provided.

At the ends 18 of the housing 12, the housing 12 and shaft 10 are radially spaced apart from one another. The inner surface of the housing 12, at the ends 18 thereof, is provided with radially inwardly extending components 20. Adjacent the components 20, annular sleeves 22 are provided on the shaft 10. Each component 20 is axially aligned with one of the sleeves 22, a radial clearance 24 being defined therebetween. In use, drilling fluid is supplied to the radial clearance 24, the drilling fluid flowing through the radial clearance 24 to the ball bearings 16 to provide lubrication of the bearings.

As mentioned briefly hereinbefore, where the motor is of small diameter, simply using the size of the clearance 24 to control or limit the proportion of drilling fluid supplied to the bearings is undesirable as, even when the clearance 24 is made as small as practically possible, the proportion of fluid flowing to the bearings is approximately 50% of the total volume of fluid supplied to the motor.

In order to restrict the supply of fluid supplied to the bearings, the component 20 is formed, on its inner surface 26, with a series of annular grooves 28 forming flow interrupting pockets 30. The provision of the pockets 30 results in the radial clearance 24 being of non-uniform size.

In use, fluid flows along the clearance 24 towards the bearings. When the fluid reaches one of the pockets 30, the increase in the size of the clearance, and hence flow area, results in a flow area expansion loss. The fluid continues to flow towards the bearings and as it leaves the pocket 30, a flow area contraction loss is encountered. The flow area expansion loss and the flow area contraction loss are both greater than the frictional losses which would have occurred if the pockets had not been provided and instead the clearance were of uniform size. The flow area expansion and contraction losses therefore serve to restrict the supply of the fluid to the bearings. In one simulation it has been found that the provision of the pockets 30 can more than double the pressure loss over a given flow path length. The number of pockets 30 can be chosen to restrict the fluid flow to the bearings to an acceptable level, for example to between 5% and 10% of the total fluid supplied to the motor.

Although in the arrangement described hereinbefore the grooves are provided in the component 20 alone, one or more grooves could alternatively be provided in the surface of the sleeve 22 which faces the component 20. A further possibility is to provide one or more grooves in the facing surfaces of both the component 20 and the sleeve 22.

The grooves 28 referred to hereinbefore are annular grooves. It is thought, however, that the annular grooves could be replaced by one or more helical or spiral shaped grooves. It is further thought that if the direction in which the helical or spiral shaped grooves are formed is chosen appropriately, then the rotation of the shaft relative to the housing, in use, could serve to urge a proportion of the fluid away from the bearings. For example, for a right hand rotating shaft, the provision of a left-handed spiral groove will result, upon rotation of the shaft, in a proportion of the fluid being urged away from the bearings.

It will be appreciated that the embodiments described hereinbefore are merely examples and that a number of modifications or alterations may be made to the specific arrangements described and illustrated without departing from the scope of the invention.

What is claimed is:

1. A bearing arrangement, comprising:
 a first component axially aligned with a second component;
 bearings being provided to support one of the first and second components for rotation relative to the other of the first and second components;
 a radial clearance being provided between cylindrical surfaces of the first and second components; and
 fluid being supplied through the radial clearance to lubricate the bearings,
 wherein the cylindrical surface of at least one of the first and second components is formed with a plurality of grooves, the grooves serving to interrupt the flow of fluid between the cylindrical surfaces thereby restricting the flow of lubricating fluid to at least one of said bearings.

2. An arrangement according to claim 1, wherein the plurality of grooves are all formed in one of the cylindrical surfaces.

3. An arrangement according to claim 1, wherein the plurality of grooves are formed in both of the cylindrical surfaces.

4. An arrangement according to claim 1, wherein the grooves are of annular form.

* * * * *